United States Patent
Ehrler et al.

(10) Patent No.: US 11,738,396 B2
(45) Date of Patent: Aug. 29, 2023

(54) END MILLING CUTTER AND METHOD FOR THE PRODUCTION THEREOF

(71) Applicant: GUEHRING KG, Albstadt (DE)

(72) Inventors: Rolf Ehrler, Teningen (DE); Martin Dallmann, Chemnitz (DE); Jakob Ebel, Inzigkofen (DE)

(73) Assignee: Guehring KG, Albstadt (DE)

( * ) Notice: Subject to any disclaimer, the term of this patent is extended or adjusted under 35 U.S.C. 154(b) by 133 days.

(21) Appl. No.: 17/022,467

(22) Filed: Sep. 16, 2020

(65) Prior Publication Data

US 2021/0086274 A1 Mar. 25, 2021

(30) Foreign Application Priority Data

Sep. 16, 2019 (DE) ...................... 10 2019 214 040.8

(51) Int. Cl.
*B23C 5/10* (2006.01)
*B23C 5/16* (2006.01)

(52) U.S. Cl.
CPC ................ *B23C 5/10* (2013.01); *B23C 5/165* (2013.01); *B23C 2210/0485* (2013.01); *B23C 2210/12* (2013.01); *B23C 2210/40* (2013.01); *B23C 2210/48* (2013.01)

(58) Field of Classification Search
CPC .......... B23C 2210/282; B23C 2210/64; B23C 2210/48; B23C 2210/246; B23C 2210/082; B23C 5/10; B23C 5/006
See application file for complete search history.

(56) References Cited

U.S. PATENT DOCUMENTS

| 4,645,389 A | 2/1987 | Maier |
| 4,934,881 A * | 6/1990 | Tsujimura ............. B23C 5/1018 407/42 |

(Continued)

FOREIGN PATENT DOCUMENTS

| DE | 33 44 620 A1 | 6/1985 |
| DE | 10 2014 106 886 A1 | 12/2014 |

(Continued)

OTHER PUBLICATIONS

DPMAregister Print Out dated Mar. 26, 2021.

*Primary Examiner* — Alan Snyder
(74) *Attorney, Agent, or Firm* — Brown & Brown IP Law PLLC (57) ABSTRACT

A milling tool comprising a cylindrical shaft part, which has a central axis and which is followed by a cylindrical cutting part comprising at least three circumferential cutting edges, which run helically and which are separated from one another by chip grooves. The circumferential cutting edges continue via cutting edge corner regions in end cutting edges, which run essentially radially and which subsequently slope away from the milling cutter face towards the central axis from radially outer end cutting edge sections, in each case with a cutting edge section, which is formed by ground-in end pockets. The cutting edge section slopes continuously all the way to the central axis. In the region of the milling cutter core, it is formed by a point thinning, which is introduced into the end pocket and by means of which a center cutting edge is created. Also, a method for producing the milling tool.

23 Claims, 7 Drawing Sheets

(56) References Cited

U.S. PATENT DOCUMENTS

| | | | | |
|---|---|---|---|---|
| 5,190,420 A * | 3/1993 | Kishimoto | ............... | B23C 5/10 |
| | | | | 407/54 |
| 9,227,253 B1 | 1/2016 | Swift et al. | | |
| 9,901,995 B2 | 2/2018 | Baba | | |
| 10,137,509 B2 * | 11/2018 | Wells | ...................... | B23P 15/34 |
| 2010/0215447 A1 * | 8/2010 | Davis | ........................ | B23C 5/10 |
| | | | | 407/115 |
| 2014/0356081 A1 | 12/2014 | Davis | | |
| 2017/0087646 A1 * | 3/2017 | Haimer | ................. | B23C 5/1081 |
| 2019/0054549 A1 | 2/2019 | Krenzer et al. | | |

FOREIGN PATENT DOCUMENTS

| | | | | |
|---|---|---|---|---|
| DE | 20 2019 005 299 U1 | 4/2020 | | |
| EP | 3 150 313 A1 | 4/2017 | | |
| WO | WO-0012249 A1 * | 3/2000 | ............... | B23C 5/10 |
| WO | 2017/144418 A1 | 8/2017 | | |

* cited by examiner

END MILLING CUTTER AND METHOD FOR THE PRODUCTION THEREOF

TECHNICAL FIELD

The present disclosure relates to an end milling or face milling cutter, respectively, according to the preamble of claim 1, of the present patent, as well as a method for producing a milling tool of this type.

Generic milling tools are described, for example, in publications DE 10 2014 106 886 A1 or WO 2017/144418 A1. They are designed against the background that they are suitable for a broadened spectrum of milling processing operations when machining with increased material removal rate.

It turns out that the milling tool according to DE 10 2014 106 886 A1 is suitable for diagonal plunging or ramping, respectively, only with reservations, and has excessive feed forces in response to the purely axial plunging into a workpiece. The focus of the milling tool according to WO 2017/144418 A1 is to improve the centering properties in response to the axial plunging. This design, however, is to the detriment of the machining performance in response to further processing, such as, e.g., the ramping with larger ramp angles or in response to the helix milling, in particular when it is important to also increase the material removal rate when processing materials, which are difficult to machine, such as higher-strength steel or high-strength cast iron types.

The invention is thus based on the object of further developing a generic milling tool in such a way that it provides for a machining with higher material removal rate when used universally, i.e. in response to pure "plunging", in response to ramping, in response to the milling of pockets or windows, and in response to the helix milling. A further object is to provide a particularly economic production method for a milling tool of this type.

With regard to the milling tool, this object is solved by means of the features of the present claims, and with regard to the method by means of the methods as described herein.

A special feature of the milling tool is to be seen in that the cutting edge section, which follows the radially outer end cutting edge sections and which is formed by the ground-in end pockets, decreases continuously away from the milling cutter face all the way to the central axis of the milling tool, and, in the region of the milling cutter core, is formed by a point thinning, which is introduced in the respective end pocket and by means of which a center cutting edge is created, which reaches all the way into the region close to the central axis. The milling tool cuts sufficiently effectively in this way even in the region of the milling cutter core, in order to even allow for a perpendicular plunging into the workpiece. Due to the design of the milling tool according to the invention, a type of hollow grinding is created at the milling cutter face, which can additionally be used to center the milling tool when plunging into the workpiece. In combination with the end cutting edges, which slope continuously towards the milling cutter axis, the end pockets create an extremely free face, in particular in the center of the milling tool, as a result of which the machining performance can additionally be increased in response to milling with any feed directions, i.e. in response to the ramping, helix milling, window milling, pocket milling, groove milling, or in response to the so-called plunging.

The special feature of the production method according to the present invention is that it can be accomplished by means of an extremely simple kinematic of the relative movement between milling tool blank and grinding disk, to not only form the end pockets, but simultaneously cutting edge sections, which follow radially outer end cutting edge sections and which slope continuously away from the milling cutter face to the central axis.

Advantageous further developments are subject matter of the subclaims.

The face in the center of the milling tool then becomes particularly free, when the cutting edge section formed by the ground-in end pockets slopes degressively, i.e. initially steeply and then increasingly flatter, to the central axis.

The operating steps for the production of the ground section can be simplified further. In addition, the point thinning of a center cutting edge can simultaneously serve to form the end flank of the cutting edge sections of the end pocket, which lead adjacently in the direction of rotation.

When, the radially outer end cutting edge sections are corrected by the end pockets, the milling tool becomes more stable in the region of the transition from the circumferential cutting edge to the radially outer end cutting edge section, which has a positive effect on the service life of the milling tool.

It has been shown that the stressing of the milling cutter core and of the cutting edges is also particularly favored in the universal use, when the center cutting edges, which are formed by the point thinning, lie in a range, which has a diameter in the range of 0.1 to 0.18×D, preferably in the range of 0.13 to 0.15×D, wherein D identifies the nominal diameter of the milling tool.

Tests have shown that an optimal chip space with simultaneously good stability of the cutting edges follows when the axial depth of the end pockets lies in the range of between 0.06 to 0.14×D, preferably between 0.08 and 0.12×D.

The service life of the end cutting edge is further increased by means of a corner protective chamfer.

To improve the smooth running of the milling tool or to reduce its tendency to oscillate, respectively, it is advantageous when the circumferential cutting edges have an unequal cutting edge pitch. They can thereby certainly have identical angles of twist, which results in a simplified production of the chip grooves.

The design of the milling tool according to the set of claims has turned out to be particularly advantageous in the nominal diameter range of 6 to 20 mm. It tends to be advantageous thereby when the number of the circumferential cutting edges becomes larger with increasing nominal diameter (DN). Moreover, it is advantageous when the respective selected angle of twist of the circumferential cutting edges is selected to be smaller with increasing number of the circumferential cutting edges.

Apart from that, the milling tool can additionally be equipped with details, which are known per se, of conventional generic milling tools, such as, e.g. of cutting edge roundings and the like, the description of which can be forgone here. However, chip breakers in the circumferential cutting edges are particularly beneficial for the machining performance.

The milling tool according to the invention develops its performance only when it is sufficiently stable or stiff, respectively. This is why it is particularly advantageous when it is made in one piece of a hard material, such as, e.g., solid carbide (SC), preferably micro-grain carbide.

The production method according to the invention is further simplified in that the cutting edge section in the region of the milling cutter core is formed by a point thinning, which is introduced into the end pocket and by means of which a center cutting edge is created, which reaches all the way into the region close to the central axis. The entire end ground section of the milling tool can thus be produced by means of two simple grinding operations.

In some embodiments, the method step according to which the end flanks of the center cutting edges, which lead adjacently in the direction of rotation, and preferably of the cutting edge sections, which lead adjacently in the direction of rotation, can be created simultaneously in response to the production of the point thinning, allows for an additional simplification of the production method.

It was shown that the end pockets can even be produced by means of a profile grinding disk, which is only moved linearly.

Exemplary embodiments of the invention will be described in more detail below on the basis of schematic drawings, in which.

DESCRIPTION OF THE EXEMPLARY EMBODIMENTS

Figure 1:
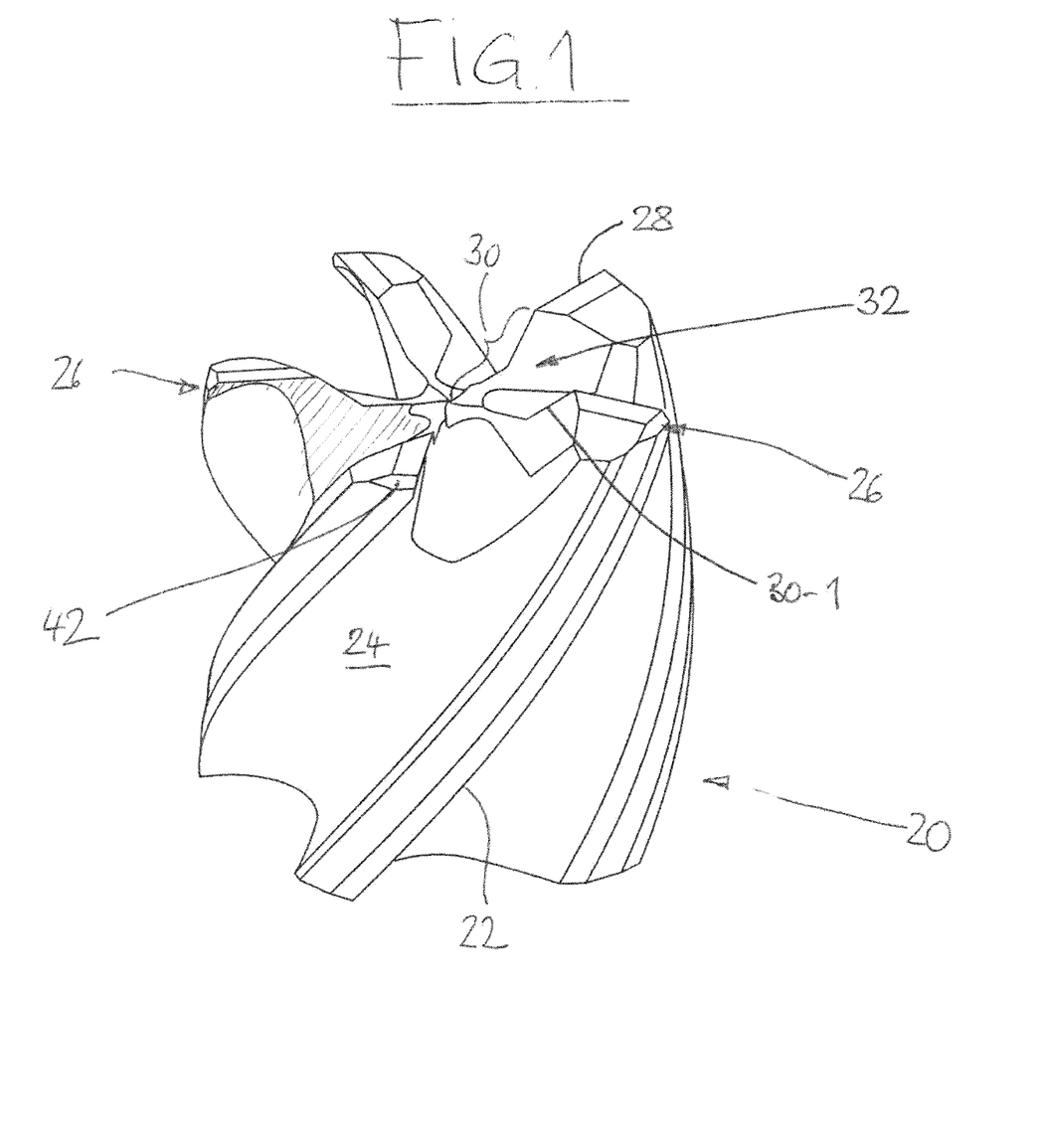
FIG. 1 shows a perspective view of the cutting part of a milling tool.

In FIG. 1, reference numeral 20 identifies the cylindrical cutting part of a milling tool in the design as end milling cutter. The circular cylindrical shaft part, which has the same central axis AM (see FIGS. 2 and 3) as the cutting part 20, and by means of which the milling tool can be clamped into a chuck, is not illustrated. The nominal diameter DN of the milling tool preferably lies between 6 and 20 mm. The direction of rotation of the milling tool is identified with RD.

The cutting part 20 has at least three, in the case of the shown embodiment 5 circumferential cutting edges 22, which run helically and which are separated from one another by means of chip grooves 24 and which have, for example, an angle of twist, i.e. a spiral or helix angle (as the angle, at which the circumferential cutting edge 22 draws with a plane, which includes the axis of the milling tool, in the range of from 30° to 40°. In the case of the shown embodiment comprising 5 circumferential cutting edges 22, the angle of twist is, for example, 38°. If, in the case of larger nominal diameters, the number of the circumferential cutting edges 22 is increased, e.g. to 7 cutting edges, the angle of twist lies in the range of 32°. The angles of twist of the individual circumferential cutting edges 22 can also slightly differ from one another, as a result of which the smooth running of the milling tool can be improved.

Figure 2:
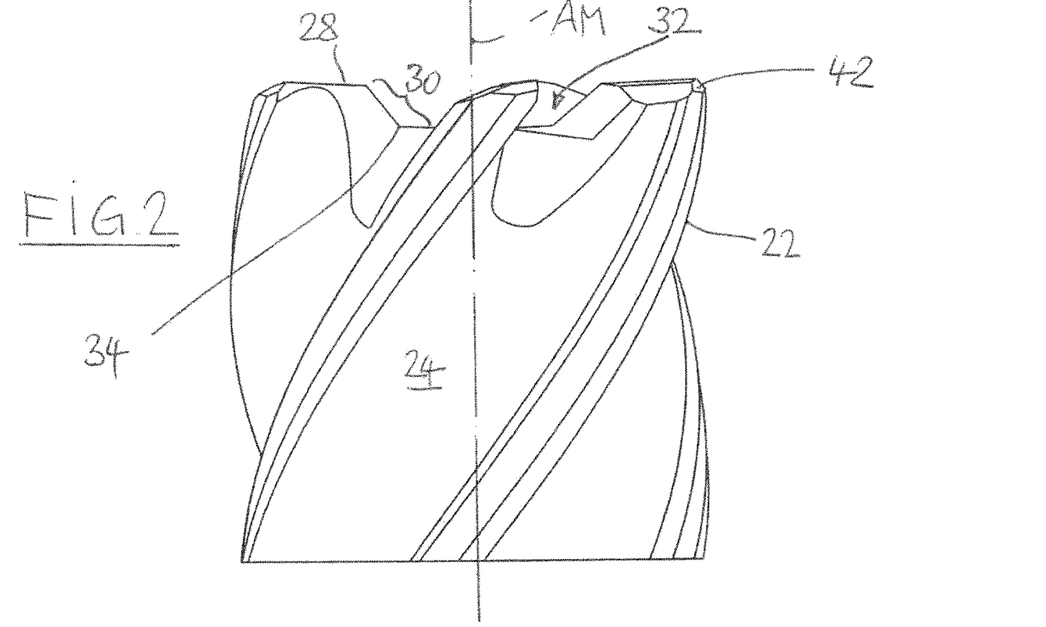
FIG. 2 shows a side view of the milling tool according to FIG. 1.

The circumferential cutting edges 22 continue via cutting edge corner regions 26 in end cutting edges, which run essentially radially and which have several sections:

As can be seen best from the illustration according to FIG. 2, a cutting edge section 30, which is formed by end pockets 32 ground into the milling cutter face and which slopes away from the milling cutter face towards the central axis AM of the milling tool, in each case follows at radially outer end cutting edge sections 28. In the case of the embodiment according to FIGS. 1 to 6, the end cutting edge section 30 is bent, i.e. it has a first cutting edge section 30-1, which slopes relatively steeply to the central axis AM, and which transitions into a second cutting edge section 30-2, which slopes in a flatter manner, at a cutting edge bend 34, see FIG. 2.

It is thus ensured that the cutting edge section 30 slopes continuously all the way to the central axis AM. In the region of the milling cutter core, i.e. of a milling cutter remnant core 36, which is delineated in FIG. 3 by means of dash-dotted line, the cutting edge section 30, which is formed by ground-in end pockets, is formed by a point thinning 38, which is introduced into the end pocket 32 and by means of which a center cutting edge 40 is created, which reaches all the way into the region close to the central axis AM. The point thinning 38 can be seen best from the illustration according to FIG. 5. A point thinning surface created by the point thinning 38 is highlighted in a hatched manner there. An end cutting edge assembly is created in this way, which can have a positive chip angle, starting at the cutting edge corner region 26 to close to the milling cutter center.

Figure 5:
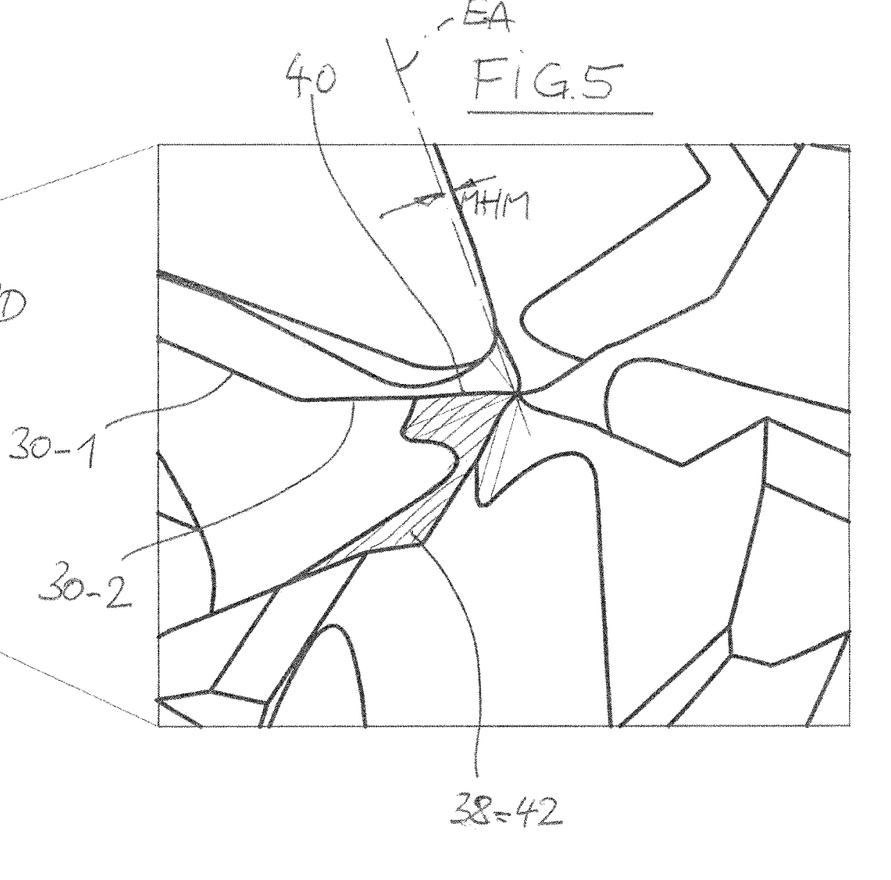
FIG. 5 shows the detail "V" in FIG. 4 in an enlarged scale.

It can furthermore be seen from FIG. 5 that the center cutting edges 40 and the cutting edge sections 30-2, which are formed by the ground-in end pockets 32, are located behind the center by a predetermined measure MHM, i.e. are located offset to an axial plane EA by the measure MHM opposite the direction of rotation RD. The grinding of the milling cutter center is simplified thereby. The radially outer end cutting edge sections 28 are preferably located in front of the center by a slight measure. This measure was determined by tests to be approximately 0.05-times the nominal diameter DN.

The radial length of the radially outer end cutting edge sections 28 can be varied within certain ranges as a function of the machining task and of the material to be machined, in order to influence the chip volume.

It can be seen that the point thinning 38 of an end cutting edge simultaneously forms the end flank 42 of the center cutting edge 40, which leads adjacently in the direction of rotation RD, and of the end cutting edge sections 30-1 and 30-2, which lead in the direction of rotation. The point thinning 38 can be designed differently with respect to its depth, shape, and position, depending on the field of application of the milling tool, as a result of which the clearance angle of the center cutting edges 40 and of the end cutting edge sections 30-1 and 30-2, as well as the chip angle of the center cutting edges 40 can be influenced. In the case of the embodiment according to FIGS. 1 to 6, the chip angle is even positive in the region of the transition from the second end cutting edge section 30-2 to the center cutting edge 40 (see FIG. 5).

Figure 3:
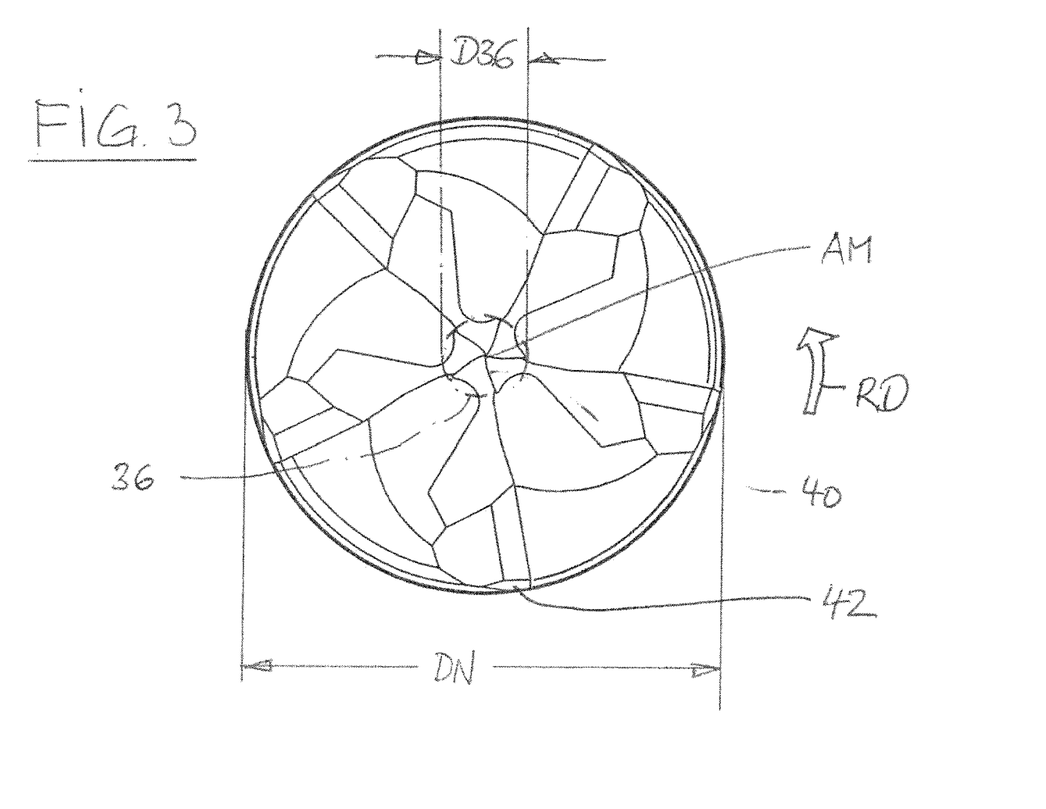
FIG. 3 shows a top view of the milling tool according to FIG. 1.
Figure 4:
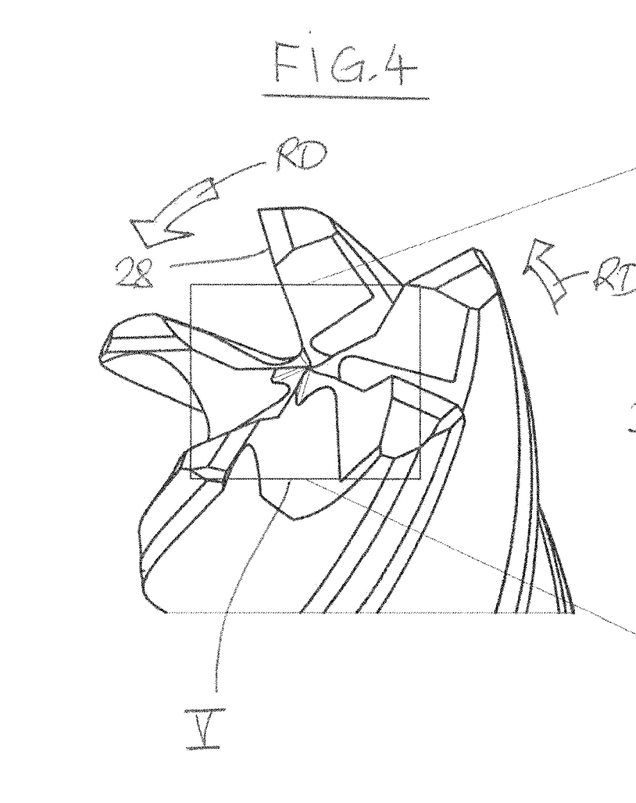
FIG. 4 shows a perspective view of the cutting part of the milling tool in a modified rotational position.

The milling cutter remnant core 36, in which the center cutting edges 40 are located, which are formed by the point thinning 38, is suggested by means of a dash-dotted line in FIG. 3. It has been shown in tests that, to realize the desired cutting performances of the milling tool while ensuring good cutting tool lives of the cutting edges, it is advantageous to maintain a diameter D36 in the range of values, which correspond to 0.1 to 0.18-times, preferably to 0.13 to 0.15-times, for example to 0.14-times the nominal diameter DN of the milling tool.

On the one hand, the described embodiment of the tip grinding of the milling tool thus has the result that the milling tool quasi cuts all the way to the center. In addition, the end pockets 32 open the milling cutter face in a manner, which had not been known until now, which results in good machining ratios in the universal milling operation, in particular in response to the ramping and in response to the plunging during helix milling operation. Tests have shown that in a milling operation of this type, the infeed can lie in the range of 0.05-times of the nominal diameter DN.

The service life of the cutting edges can be further improved by means of additional measures, for example in that a transition region of circumferential cutting edge 22 and radially outer end cutting edge section 28, thus the cutting edge corner region 26, obtains a corner protective chamfer 42. Further cutting edge roundings can additionally also be provided.

It can further be seen from the illustrations of FIGS. 1 to 6 that the production of the end pockets 32 is simultaneously used to correct the course of the radially outer end cutting edge sections 28, which follows from the hatching highlighted in FIG. 1 of the surface, which is created by the end pocket 32 and which reaches the radially outer end cutting edge section 28.

It thus follows from the above description that the end cutting edge section 30, which is formed by the ground-in end pockets 32, slopes degressively to the central axis AM, as a result of which the volume of the end pockets 32 becomes as large as possible. The center cutting edges 40 thus quasi run together in the center of the milling tool and form the bottom of the end pocket. Tests have shown that a particularly good compromise of machining, universality of the field of application, chip removal, and cutting edge service life can be attained when the axial depth T32, see FIG. 6, of the end pockets 32 lie in a range, which corresponds to 0.06 to 0.14-times, preferably to 0.08 and 0.12-times, for example to 0.1-times the nominal diameter DN.

Figure 6:
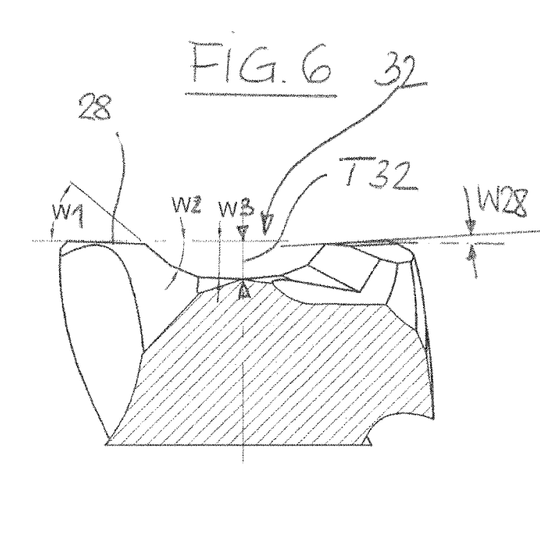
FIG. 6 shows a longitudinal section of the milling tool through the tool axis with a first design of the end cutting edges.
Figure 7:
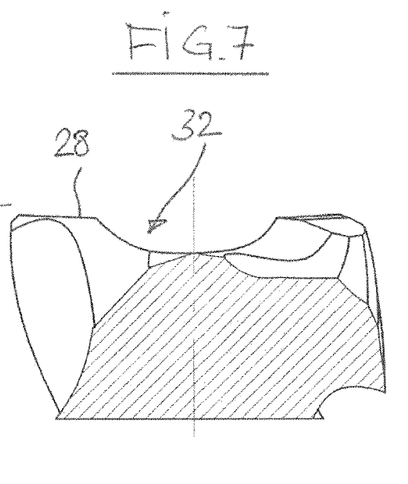
FIG. 7 shows a longitudinal section of the milling tool through the tool axis with a second design of the end cutting edges.
Figure 8:
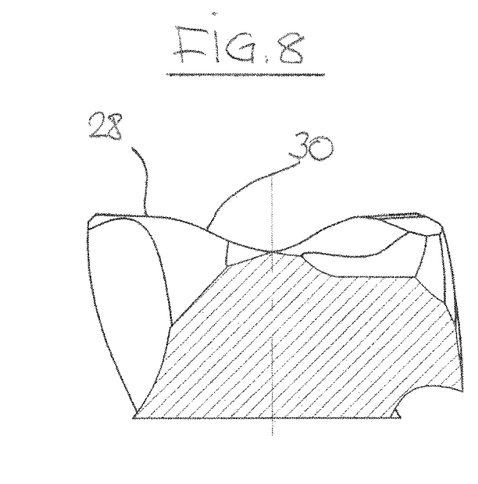
FIG. 8 shows a longitudinal section of the milling tool through the tool axis with a third design of the end cutting edges.

Alternatives of the course of the end cutting edges 28, 30, and 40 are shown in FIGS. 6 to 8.

In the case of the alternative according to FIG. 6, the radially outer end cutting edge sections 28 already slope to the center of the milling tool at a small angle W28, which lies, for example, in a range of 0.5 to 2°.

The largest dip W1 lies in the region of the cutting edge section 30-1. It is, for example, 45°. The following dip W2 of the cutting edge section 30-2 is significantly smaller and is, for example, only 1 to 2°.

The third dip W3, i.e. the dip of the center cutting edges 40, follows from the geometry and positional arrangement of the point thinning 38 or of the end flank 42, respectively. In the illustration according to FIG. 6, it is smaller than W2, but can also be larger than the dip W2.

FIGS. 7 and 8 show alternatives of the design of the end pockets 32. According to FIG. 7, the cutting edge section, which is formed by the ground-in end pockets 32, follows a bend-free convex line. In the case of the alternative according to FIG. 8, the radially outer end cutting edge sections 28 transition in a rounded manner into the cutting edge sections 30, which are formed by ground-in end pockets 32. The end cutting edges as a whole thus follow an S-line.

To reduce the milling tool's tendency to oscillate, the circumferential cutting edges 22 have an unequal cutting edge pitch. If identical angles of twist are selected, the end cutting edges 28 are thus spaced apart unequally in the circumferential direction. In the alternative, the angles of twist of at least two circumferential cutting edges 22 can differ from one another. In this case, an even cutting pitch of the circumferential cutting edges 22 can be present in the cutting part 20 in a radial plane, which is perpendicular to the central axis AM.

The number of the circumferential cutting edges 22 preferably becomes larger with increasing nominal diameter DN, whereby further advantageously, angle of twist is selected to be smaller with increasing number of the circumferential cutting edges 22.

The circumferential cutting edges 22 can additionally be formed in a manner, which is known per se, with chip breakers, which are not illustrated in more details.

The above-described milling tool is usually made in one piece of a hard material, such as, e.g., solid carbide (SC), preferably micro-grain carbide, so that a sufficient stability and cutting edge service life can be ensured.

The special feature of the above-described milling tool is also that it can be produced by means of a fairly simple method.

This is so, because only a number of end pockets 32, which corresponds to the number of the circumferential cutting edges 22, has to be ground in to produce the end cutting edges 28, 30, 40, which usually run radially, so that the cutting edge sections 30-1, 30-2, which follow the radially outer end cutting edge sections 28, are formed, which slope continuously away from the milling cutter face all the way to the central axis AM.

Alternatives for producing the cutting edge sections 30-1, 30-2, which are formed by ground-in end pockets 32, are shown in FIGS. 9 to 12.

Figure 9:
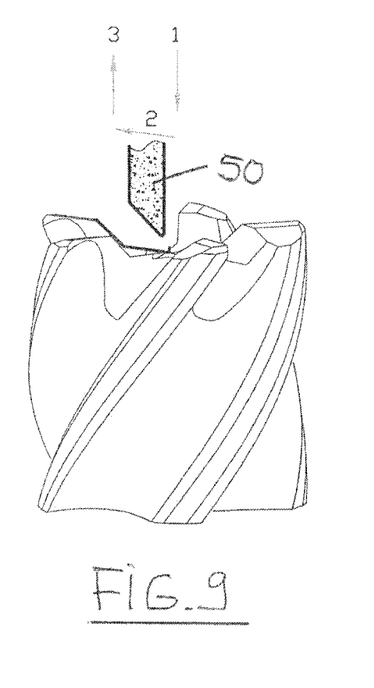
FIGS. 9 to 12 show four alternatives of a method for producing an end pocket of the milling tool.

In the case of the alternative according to FIG. 9, the end pocket 32 is produced by means of a narrow profile grinding disk 50, which only has to be moved in a U-shape, by means of the feed motions 1, 2, and 3.

Figure 10:
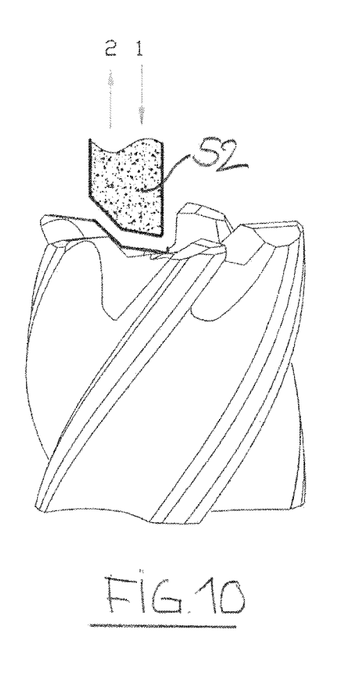

The alternative according to FIG. 10 operates with a profile grinding disk 52, which has a bend profile and only carries out a plunging and emerging motion 1 and 2. This alternative, as well as the alternative according to FIG. 9, can produce the cutting edge course of the embodiment shown in FIGS. 1 to 6.

Figure 11:
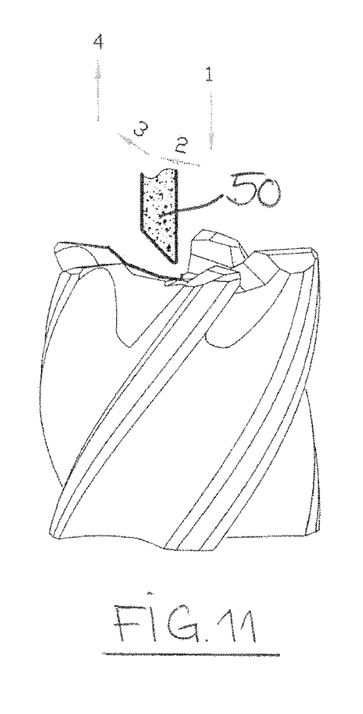
Figure 13:
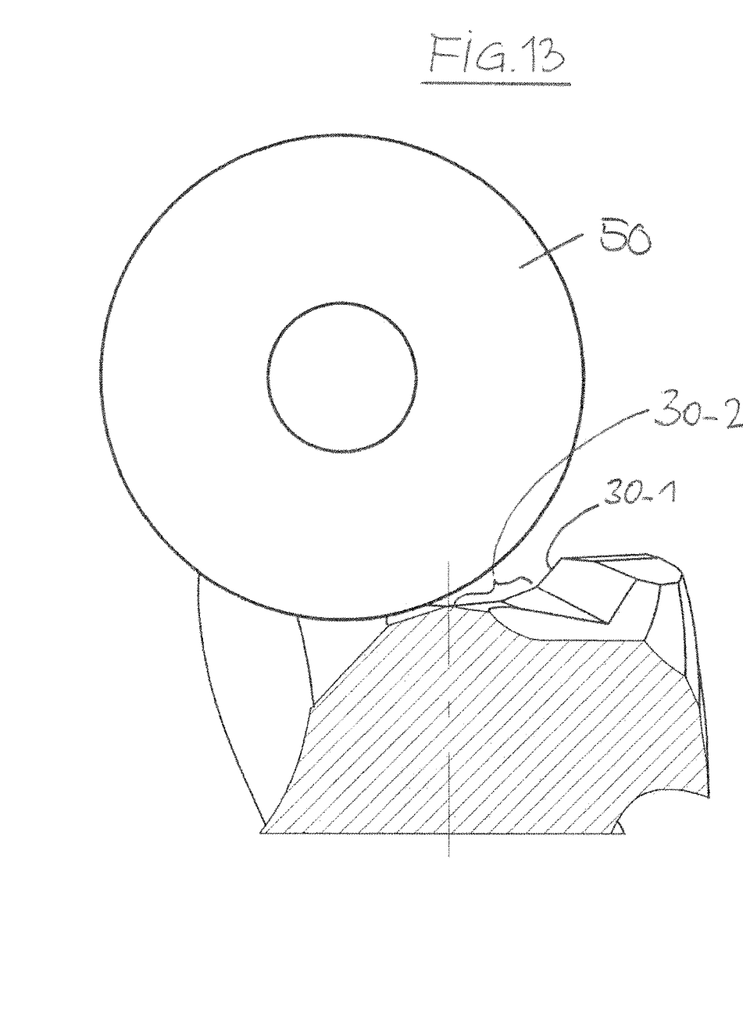
FIGS. 13 and 14 show schematic views for describing the kinematic in response to the production of the end pocket of the milling tool.
Figure 14:
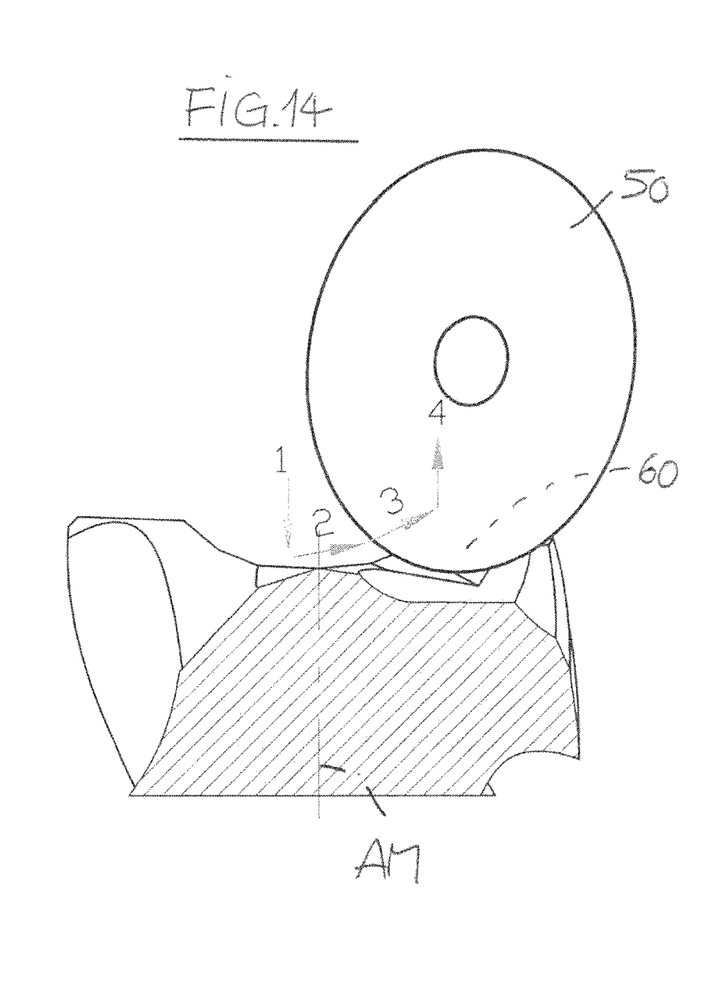

The alternative according to FIG. 11 modifies the alternative according to FIG. 9 in such a way that it creates a further bend point in the cutting edge section, which is formed by the ground-in end pockets 32, so that grinding operations are carried out in 4 directions of motion 1, 2, 3, and 4. This motion sequence is shown in an enlarged illustration in FIGS. 13 and 14. In the region of the milling cutter center AM, the grinding disk 50 plunges into the tool blank (direction of motion 1) and is then guided radially to the outside with the directions of motion 2 and 3, which become increasingly steeper, and is finally lifted off the blank with the direction 4, after the flank 60 has been ground.

Figure 12:
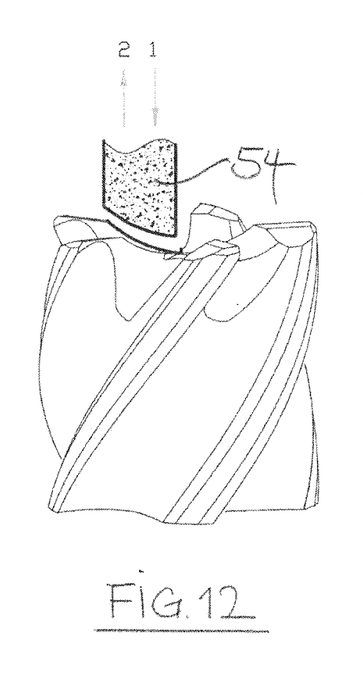

Finally, the alternative according to FIG. 12 corresponds to the alternative according to FIG. 10, with the difference that the grinding disk profile is modified.

Figure 15:
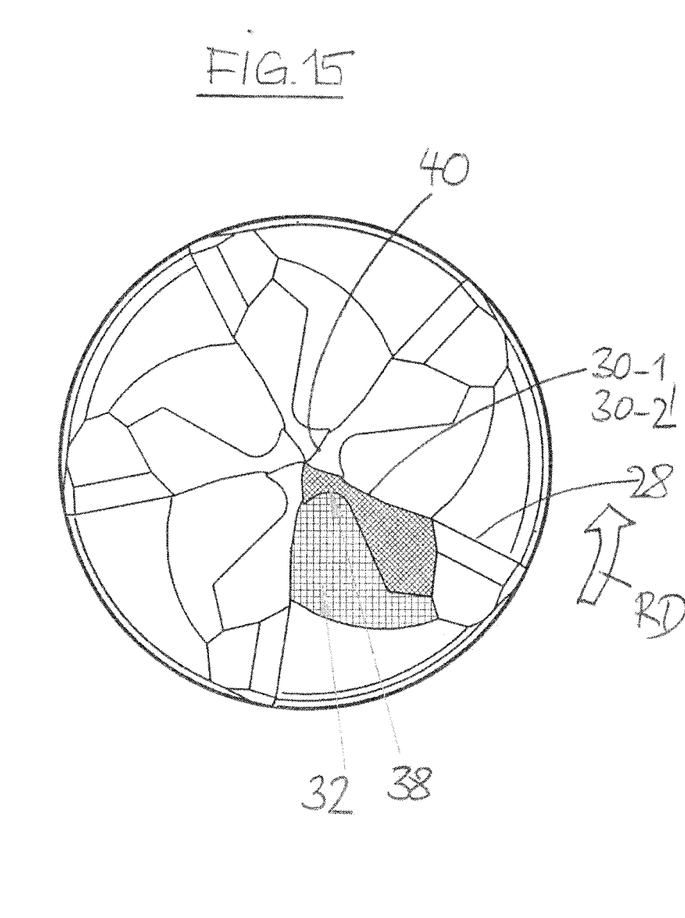
FIG. 15 shows a top view of the milling tool with marking of the surfaces created by the grinding disk in response to the production of the end pockets and of the point thinning.
Figure 16:
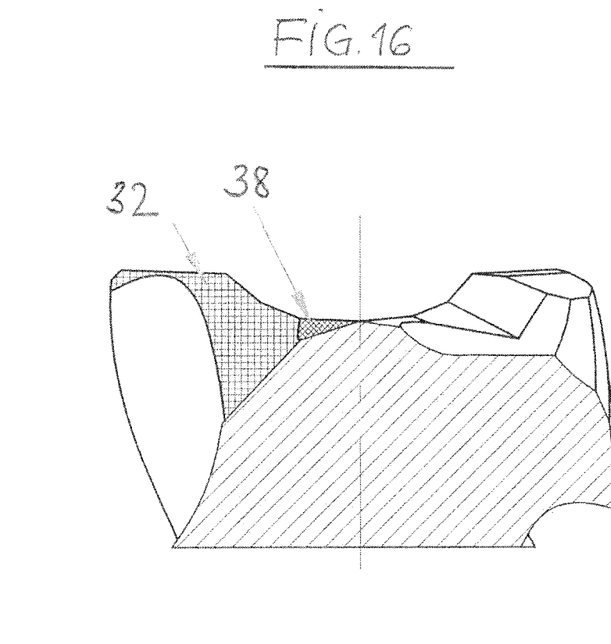
FIG. 16 shows a sectional view of the milling tool with marking of the surfaces created by the grinding disk in response to the production of the end pockets and of the point thinning.

The final appearance of the ground tip section is then obtained in that, in the region of the milling cutter core or milling cutter remnant core 36, respectively, the cutting edge section is formed by a point thinning 38, which is introduced into the end pocket 32 and by means of which the center cutting edge 40 is created, which reaches all the way into the region close to the central axis AM. One thereby preferably proceeds in such a way that in response to the production of the point thinning 38, the end flanks 42 of the center cutting edges 40, which lead adjacently in the direction of rotation RD, and preferably of the cutting edge sections 30-1, 30-2, which lead adjacently in the direction of rotation, are created simultaneously, which follows from the illustration according to FIGS. 15 and 16. The point thinning 38 is identified with the narrowly shaded surface, the surface created by the ground-in end pocket 32 is identified with the further shaded surface.

The ground section of the milling tool can thus be produced by means of a linearly moved profile grinding disk, when the diameter of the profile grinding disk is selected to be sufficiently large. In the case of a smaller disk diameter, a further degree of mobility can be added.

It goes without saying that deviations from the shown embodiments are possible, without leaving the basic idea of the invention.

In addition to the shown end cutting edges 28, 30-1, 30-2, 40, radially outer end cutting edges located therebetween can, for example, be located, which are not followed by any cutting edge sections 30.

The end cutting edges can also run in a convex or concave manner, viewed in the top view, they generally do not have to be aligned radially.

The cutting edges can also be equipped with primary and secondary clearance angles. Depending on the material of the milling tool and/or of the material to be machined, the chip angles can also vary.

The invention thus creates a milling tool, in particular designed as end milling cutter, comprising a cylindrical shaft part, which has a central axis and which is followed by a cylindrical cutting part comprising at least three, preferably at least 5 circumferential cutting edges, which run helically and which are separated from one another by means of chip grooves. The circumferential cutting edges continue via cutting edge corner regions in end cutting edges, which run essentially radially and which subsequently slope away from the milling cutter face ( ) towards the central axis from radially outer end cutting edge sections, in each case with a cutting edge section, which is formed by ground-in end pockets. To make the field of application of the milling tool more universal with improved material removal rate, the cutting edge section slopes continuously all the way to the central axis, and, in the region of the milling cutter core, it is formed by a point thinning, which is introduced into the end pocket and by means of which a center cutting edge is created, which reaches all the way into the region close to the central axis.

The invention claimed is:

1. A milling tool, comprising a cylindrical shaft part, which has a central axis, and a cylindrical cutting part comprising at least three cutting edges, each cutting edge comprising a circumferential cutting edge, a cutting edge corner region, a radially outer cutting edge section and a radially inner cutting edge section, wherein:
   the circumferential cutting edges run helically and are separated from one another by chip grooves,
   the radially outer cutting edge sections run essentially radially and slope away from a milling cutter face of the milling tool toward a central axis of the milling tool, and
   the radially inner cutting edge sections are formed by ground-in end pockets and slope continuously away from the milling cutter face all the way to the central axis and, in a region of a milling cutter core of the milling tool, each radially inner cutting edge section comprising a first section having a first slope relative to the milling cutter face and a second section having a second slope relative to the milling cutter face, the second section closer to the central axis of the milling tool, the first slope greater than the second slope, a portion of each radially inner cutting edge section is formed by a point thinning, which is introduced into the end pocket and by means of which a center cutting edge of each radially inner cutting edge is created, which extends from a first end to a second end that is closer to the central axis.

2. The milling tool according to claim 1, wherein the radially inner cutting edge sections formed by ground-in end pockets slopes degressively toward the central axis.

3. The milling tool according to claim 1, wherein the point thinning of the center cutting edges are formed by an end flank of the center cutting edges, which lead adjacently in a direction of rotation.

4. The milling tool according to claim 1, wherein the radially outer cutting edges slope more steeply away from the milling cutter face than the radially inner cutting edges do.

5. The milling tool according to claim 1, wherein the radially outer cutting edge sections are connected by the end pockets.

6. The milling tool according to claim 1, wherein the milling cutter core, in which the center cutting edges are located, which are formed by the point thinning, has a diameter in the range of 0.1 to 0.18×D, wherein D is a nominal diameter of the milling tool.

7. The milling tool according to claim 1, wherein an axial depth of the end pockets lies in the range between 0.06 to 0.14×D, wherein D is a nominal diameter of the milling tool.

8. The milling tool according to claim 1, wherein a transition region of circumferential cutting edges and the radially outer cutting edge section each have a corner protective chamfer.

9. The milling tool according to claim 1, wherein the circumferential cutting edges have respective unequal cutting edge pitches.

10. The milling tool according to claim 1, wherein a number of the circumferential cutting edges is selected to be larger with increasing nominal diameter, and the angle of twist is selected to be smaller with increasing number of the circumferential cutting edges.

11. The milling tool according to claim 1, wherein the circumferential cutting edges are formed with chip breakers.

12. The milling tool according to claim 1, wherein the milling tool is an end milling cutter.

13. The milling tool according to claim 1, wherein the milling cutter core, in which the center cutting edges are located, which are formed by the point thinning, has a diameter in the range of 0.13 to 0.15×D, wherein D is a nominal diameter of the milling tool.

14. The milling tool according to claim 1, wherein an axial depth of the end pockets lies in the range between 0.08 and 0.12×D, wherein D is a nominal diameter of the milling tool.

15. The milling tool according to claim 1, wherein the circumferential cutting edges have respective cutting edge pitches that are unequal, and identical angles of twist.

16. The milling tool according to claim 1, wherein the milling tool is formed in one piece of a material selected from among solid carbide and micro-grain carbide.

17. A method for producing a milling tool according to claim 1, wherein at least three helically running chip grooves are initially ground into a circular cylindrical blank, and a number of end pockets, which corresponds to a number of the circumferential cutting edges, are subsequently ground in to produce said radially outer cutting edge sections and said radially inner cutting edge sections.

18. The method according to claim 17, wherein said portions of each radially inner cutting edge section in the region of the milling cutter core are formed by point thinning introduced into the end pocket and by means of which said center cutting edges are created.

19. The method according to claim 17, wherein end flanks of the center cutting edges, which lead adjacently in the direction of rotation, are created simultaneously in response to production of the point thinning.

20. The method according to claim 17, wherein the end pockets are produced with a linearly moved profile grinding disk.

21. The method according to claim 17, wherein at least five helically running chip grooves are initially ground into the circular cylindrical blank.

22. The method according to claim 17, wherein the end flanks of the center cutting edges, and of the cutting edge sections, which lead adjacently in the direction of rotation, are created simultaneously in the point thinning.

23. A milling tool, comprising a cylindrical shaft part, which has a central axis, and a cylindrical cutting part comprising at least three cutting edges, each cutting edge comprising a circumferential cutting edge, a cutting edge corner region, a radially outer cutting edge section and a radially inner cutting edge section, wherein:

the circumferential cutting edges run helically and are separated from one another by chip grooves, the radially outer cutting edge sections run essentially radially and slope away from a milling cutter face of the milling tool toward a central axis of the milling tool, and each radially inner cutting edge section comprises a first section having a first slope relative to the milling cutter face and a second section having a second slope relative to the milling cutter face, the second section is closer to the central axis of the milling tool, and the first slope greater than the second slope.

* * * * *